(12) United States Patent
Singh et al.

(10) Patent No.: US 11,995,072 B2
(45) Date of Patent: *May 28, 2024

(54) NESTED QUERY EXECUTION TOOL

(71) Applicant: Oracle International Corporation, Redwood Shores, CA (US)

(72) Inventors: Prashant Singh, Lexington, MA (US); Rasika Vaidya Kaura, Dublin, CA (US); Henrik Michael Ammer, Auburn, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,468

(22) Filed: Mar. 9, 2023

(65) Prior Publication Data

US 2023/0214381 A1 Jul. 6, 2023

Related U.S. Application Data

(63) Continuation of application No. 17/449,631, filed on Sep. 30, 2021, now Pat. No. 11,636,101.
(Continued)

(51) Int. Cl.
*G06F 16/242* (2019.01)
*G06F 3/0482* (2013.01)
(Continued)

(52) U.S. Cl.
CPC ........ *G06F 16/2428* (2019.01); *G06F 3/0482* (2013.01); *G06F 3/0486* (2013.01);
(Continued)

(58) Field of Classification Search
CPC .. G06F 16/2428; G06F 3/0482; G06F 3/0486; G06F 16/24535; G06F 16/2458;
(Continued)

(56) References Cited

U.S. PATENT DOCUMENTS 9,330,139 B2 * 5/2016 Chen ................... H04L 67/10
 707/722
10,275,493 B1 4/2019 Mostak
(Continued)

FOREIGN PATENT DOCUMENTS

CN 112236765 A 1/2021

*Primary Examiner* — Yuk Ting Choi
(74) *Attorney, Agent, or Firm* — Invoke

(57) ABSTRACT

Techniques for executing operations associated with subsets of queries in a set of nested queries are disclosed. A graphical user interface displays individual sub-queries as separate visual representations. Based on detecting a selection, a system executes a selected query in the set of nested queries, without executing parent queries in the set of nested queries. Based on detecting another selection, the system exports a selected query without exporting parent queries of the selected query. The system copies the metadata describing the selected query and transfers the metadata to another set of nested queries. Based on detecting another selection, the system displays a results count for a selected query. The system displays a number representing the number of results returned by the selected query, without displaying the query results.

22 Claims, 8 Drawing Sheets

Related U.S. Application Data

(60) Provisional application No. 63/200,474, filed on Mar. 9, 2021, provisional application No. 63/155,817, filed on Mar. 3, 2021, provisional application No. 63/148,864, filed on Feb. 12, 2021, provisional application No. 63/147,564, filed on Feb. 9, 2021.

(51) Int. Cl.
    *G06F 3/0486*     (2013.01)
    *G06F 16/2453*     (2019.01)
    *G06F 16/2458*     (2019.01)
    *G06F 16/248*     (2019.01)
    *G06F 16/25*     (2019.01)

(52) U.S. Cl.
    CPC .... *G06F 16/24535* (2019.01); *G06F 16/2458* (2019.01); *G06F 16/248* (2019.01); *G06F 16/258* (2019.01); *G06F 2203/04803* (2013.01)

(58) Field of Classification Search
    CPC ................ G06F 16/248; G06F 16/258; G06F 2203/04803; G06F 3/0481
    See application file for complete search history.

(56) References Cited

U.S. PATENT DOCUMENTS

| | | |
|---|---|---|
| 10,331,899 B2 | 6/2019 | Pattabhiraman et al. |
| 10,341,172 B1 * | 7/2019 | Vanden Berg .... G06F 16/24542 707/722 |
| 10,592,506 B1 | 3/2020 | Thombre et al. |
| 10,817,576 B1 | 10/2020 | Davidovich et al. |
| 11,030,192 B2 | 6/2021 | James et al. |
| 11,216,511 B1 * | 1/2022 | Bigdelu ................ G06F 16/248 707/722 |
| 11,263,268 B1 | 3/2022 | Bourbie et al. |
| 11,636,128 B1 * | 4/2023 | Bigdelu .............. G06F 16/2428 707/722 |
| 11,644,955 B1 | 5/2023 | Singamneni et al. |
| 2004/0243799 A1 | 12/2004 | Hacigumus et al. |
| 2005/0015361 A1 | 1/2005 | Payton et al. |
| 2006/0074878 A1 | 4/2006 | Miller |
| 2006/0235828 A1 | 10/2006 | Dettinger et al. |
| 2007/0136239 A1 | 6/2007 | Lee et al. |
| 2009/0055367 A1 | 2/2009 | Colgrave et al. |
| 2010/0161646 A1 | 6/2010 | Ceballos et al. |
| 2013/0247207 A1 | 9/2013 | Hugard et al. |
| 2013/0290294 A1 | 10/2013 | Fuller et al. |
| 2014/0189548 A1 | 7/2014 | Werner |
| 2014/0229462 A1 | 8/2014 | Lo |
| 2015/0120776 A1 | 4/2015 | Gopalan et al. |
| 2015/0378693 A1 | 12/2015 | Boag et al. |
| 2016/0140166 A1 * | 5/2016 | Schechter ........... G06F 16/2452 707/714 |
| 2017/0193127 A1 | 7/2017 | Chen et al. |
| 2017/0337232 A1 | 11/2017 | Caspi et al. |
| 2018/0032574 A1 | 2/2018 | Vandenberg |
| 2018/0089263 A1 | 3/2018 | Gerard |
| 2018/0089265 A1 | 3/2018 | Gerard |
| 2019/0188203 A1 | 6/2019 | James et al. |
| 2020/0073983 A1 | 3/2020 | Sen et al. |
| 2020/0342018 A1 | 10/2020 | Lange et al. |
| 2021/0034621 A1 | 2/2021 | Patel et al. |
| 2021/0124781 A1 | 4/2021 | Tabb et al. |
| 2021/0173851 A1 * | 6/2021 | Dorne ................ G06F 16/9532 707/722 |
| 2022/0329616 A1 | 10/2022 | O'Hearn et al. |

* cited by examiner

NESTED QUERY EXECUTION TOOL

INCORPORATION BY REFERENCE; DISCLAIMER

Each of the following applications are hereby incorporated by reference: U.S. Non-Provisional patent application Ser. No. 17/449,631 filed Sep. 30, 2021; U.S. Provisional Patent Application 63/200,474, filed Mar. 9, 2021 U.S. Provisional Patent Application 63/155,817, filed Mar. 3, 2021; U.S. Provisional Patent Application 63/148,864, filed Feb. 12, 2021; U.S. Provisional Patent Application; 63/147,564, filed Feb. 9, 2021. The applicant hereby rescinds any disclaimer of claims scope in the parent application(s) or the prosecution history thereof and advise the USPTO that the claims in the application may be broader that any claim in the parent application(s).

TECHNICAL FIELD

The present disclosure relates to a visualization tool for displaying and executing operations for nested queries. In particular, the present disclosure relates to a system and user interface including an interactive visual representation for executing operations associated with sub-sets of queries in a set of nested queries.

BACKGROUND

Database systems store vast amounts of data that is accessible by end users. To generate actionable information from the data stored in the database system, users execute queries that filter records returned from the database system to only those records applicable to the user. For example, a user may generate a query to retrieve only records from a defined object having defined values for a defined attribute. Often, queries are written with multiple layers of sub-queries, each layer performing one or both of filtering data from a sub-query lower in the hierarchy and filtering data from an object in the database. The sub-queries output attribute data to parent queries. Complex queries may include many layers of nested sub-queries. Each sub-query may include multiple data retrieval operations from one or more objects and/or multiple operations to filter retrieved data prior to outputting the data. As a result of multiple and complex nested relationships between queries, and multiple operations performed by each query, complex queries may appear unintelligible to anyone other than the author of a query.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
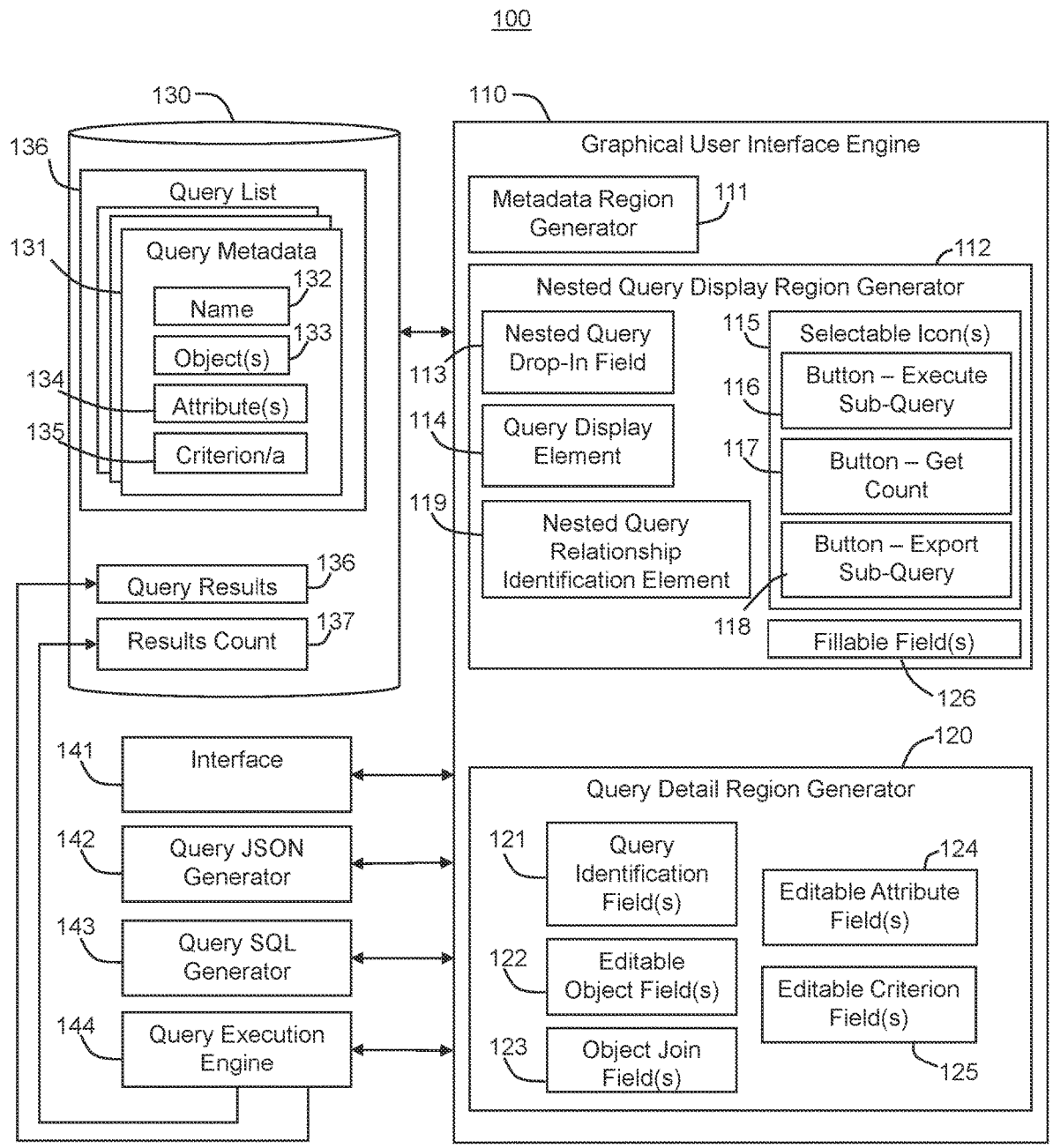
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. OPERATIONS FOR SUB-SETS OF QUERIES IN SET OF NESTED QUERIES
4. INDEPENDENT EXECUTION OF ISOLATED SUB-QUERY IN QUERY SET
5. EXPORTING A SUB-QUERY IN A SET OF NESTED QUERIES AS A STAND-ALONE QUERY
6. GENERATION OF RESULTS COUNT FOR SUB-QUERY IN QUERY SET
7. COMPUTER NETWORKS AND CLOUD NETWORKS
8. MISCELLANEOUS; EXTENSIONS
9. HARDWARE OVERVIEW

1. General Overview

One or more embodiments implement an interactive query builder for a composite query with nested sub-queries. The interactive query builder allows a user to observe, analyze, and modify query characteristics and attributes of a set of nested sub-queries. The system displays an interactive visual depiction of the set of nested sub-queries. The interactive visual depiction includes visual representations of each of the set of nested sub-queries. The visual representations of the nested sub-queries are positioned relative to each other based on the relationships between the nested sub-queries. Accordingly, the interactive visual depiction indicates, via positioning of the visual representations, the relationships between the nested sub-queries.

In one or more embodiments, the system displays user interface elements in the interactive visual depiction of the set of sub-queries. Examples herein refer to specific types of user interface elements such as buttons, icons, and check-boxes. However, these examples are equally applicable to any other type of user interface element. In one example, the system displays a query detail region alongside a nested query display region. The query detail region includes buttons and editable fields for editing one or more queries in the set of nested queries. In one or more embodiments, the system receives an input associated with executing a sub-query of the composite query. The system may execute only the selected sub-query, without executing a parent query. In addition, or in the alternative, the system may execute only the selected sub-query without executing one or more child queries. Alternatively, the system may execute the selected sub-query as well as any child queries of the selected sub-query, without executing any parent queries of the selected sub-query.

In one or more embodiments, the system receives a selection associated with exporting a sub-query from a composite query independently from any other sub-queries in the composite query. The system saves the metadata associated with the sub-query. A new sub-query is generated based on the saved metadata. In one or more embodiments, the new sub-query is a stand-alone query without any parent query or child queries. In an alternative embodiment, the new sub-query is one or both of a parent query and a child query of another sub-query in a separate set of nested queries. In one or more embodiments, the system may export both the selected query and any child query of the selected query to a different composite query. In one or more embodiments, the system exports the selected query and child queries in response to detecting a selection of a button to export both the selected query and the child queries. In addition, or in the alternative, the exported sub-query may be saved as a query template. When the system detects a drag-and-drop action associated with the query template, the system generates a visual representation of the exported query in a query display region of a graphical user interface (GUI).

In one or more embodiments, the system receives a selection associated with generating a result count for a selected query. The result count may be a number indicating the results that would be returned by the query upon execution of the query. The result count may be generated and displayed without displaying results from the query. In one or more embodiments, the system generates a result count for only a selected sub-query in a composite query. The system may refrain from generating and displaying a result count for any parent queries to a selected query. Alternatively, the system may generate a results count for each query in a set of nested query and may update the results count when any one query is modified. In addition, or in the alternative, the system may display a results count for one or more queries in the set of nested queries without receiving a user input to do so.

In one or more embodiments, the system generates JSON data describing the composite query displayed by the set of nested queries. The system converts the JSON data to SQL code associated with one or more SQL database dialects. The system may display to the user a preview of one or both of the JSON code and the SQL code prior to executing the SQL code.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes a graphical user interface (GUI) engine 110, a data repository 130, an interface 141, a query JSON generator 142, a query SQL generator 143, and a query execution engine 144.

The GUI engine 110 includes a selectable metadata region generator 111, a nested query display region generator 112, and a query detail region generator 120. The selectable metadata region generator 111 obtains query metadata 131 from the data repository 130.

In one or more embodiments, the query metadata 131 includes a list 136 of query templates having different characteristics. Examples of query characteristics included in the metadata include a query name 132, an object 133 associated with the query, attributes 134 input to/output from/operated on by the query, and other criteria 135 defining values obtained by the query. Examples of criteria include operands to be applied to attributes when the query is executed and ranges of values for attributes to be returned when the query is executed.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the graphical user interface engine 110. Alternatively, or additionally, a data repository 130 may be implemented or executed on a computing system separate from the graphical user interface engine 110. A data repository 130 may be communicatively coupled to the graphical user interface engine 110 via a direct connection or via a network.

Information describing query metadata 131 may be implemented across any of components within the system 100. However, this information is illustrated within the data repository 130 for purposes of clarity and explanation.

The nested query display region generator 112 generates a nested query display region. The nested query display region may include, for example, a nested query drop-in field 113. The nested query display region generator 112 generates a nested query responsive to detecting a drag-and-drop action of the interface 141. In one or more embodiments, the nested query display region includes a visual representation of a query 114. A visual representation of a query 114 may be, for example, a geometric shape, such as a rectangle. The name of the query may be displayed in the geometric shape. In one or more embodiments, selectable buttons 115 are displayed in the visual representation of a query 114. In one or more embodiments, the nested query display region generator 112 includes functionality to display an "Execute Query" button 116 associated with a sub-query to execute the sub-query, without executing every other query in the set of nested queries. In one or more embodiments, the selectable icons include a "Get Count" button 117 to get a count of results returned by a particular sub-query in a set of nested queries. In one or more embodiments, the selectable icons incudes an "Export Sub-Query" button 118 to export a selected sub-query to be used in another set of nested queries. In one or more embodiments, the visual representation of a query 114 has fillable fields 126 displayed inside the visual representation of a query 114. Examples of fillable fields include a field to edit a query name, to edit an object name associated with the query, to enter attribute names associated with the query, or to enter one or more criteria associated with the query.

In one or more embodiments, a nested query relationship identification element 119 displays a visual representation of a nested relationship between two queries. For example, in an embodiment in which the queries are displayed as geometric shapes, one geometric shape may be arranged relative to the other to indicate a nested relationship. For example, each child query may be offset by its parent query by a pre-defined distance. Examples of nested query relationship identification elements include offsets, spatial relationships between queries, buttons identifying a query as one or both of a parent/child, and color-coding queries.

The query detail region generator 120 generates a query detail region for a selected query. For example, the nested query display region generator 112 may display a set of nested queries as geometric shapes. Responsive to detecting a user selection of one of the nested queries, the query detail region generator 120 displays alongside the nested query drop-in field 113 additional fields containing further detail regarding characteristics of the selected query. Query identification fields 121 include, for example, a query name, a name of query metadata used to generate the query, and a unique identifier for the query.

The editable object field 122 is an editable field occupied by the name of the object or objects accessed by the query upon execution of the query. In one or more embodiments, the editable object field 122 includes a drop-down menu or list of selectable objects. In one or more embodiments, the editable object field 122 receives inputs to type or enter an object name, or a portion of an object name, and the query detail region generator 120 searches the objects accessible by the query execution engine 144 to determine if there is a matching object.

The "object join" field 123 receives an input to select one or more additional objects to be added to the selected query. In one or more embodiments, when the system 100 detects a selection of an additional object to be added to the query, the nested query display region generator 112 automatically generates a representation of a new child query associated with the selected query.

The editable attribute field 124 receives an input to select attributes that will affect the output of the query. For example, if an object associated with the query includes five attribute fields, the editable attribute field 124 may include a drop-down menu or list of the five attributes stored by the object. The editable attribute field 124 may receive a selection of one or more of the attributes that will be retrieved, excluded, or operated on to generate a query output.

The editable criterion field 125 receives an input to select one or more criteria to be applied to objects, attributes, and/or attribute values to return one or more output values from the query. For example, the editable criteria field 125 may receive an input to include two attribute values and a Boolean AND operator as a criterion to return only records from an object having both of the selected attribute values.

The system 100 includes an interface 141 to allow a user to interact with the graphical user interface engine 110. In one or more embodiments, interface 141 refers to hardware and/or software configured to facilitate communications between a user and the graphical user interface engine 110. Interface 141 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 141 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 141 is specified in one or more other languages, such as Java, C, or C++.

A query JSON generator 142 renders the set of nested queries displayed by the nested query display region generator as JSON data format prior to executing the queries. As the graphical user interface engine 110 adds nested queries and modifies characteristics of the queries, the query JSON generator 142 updates the JSON data accordingly. In one or more embodiments, the graphical user interface engine 110 includes a button to display the JSON data format associated with a selected nested query.

A query SQL generator 143 generates the nested queries in SQL language. In one or more embodiments, the graphical user interface engine 110 includes a button to display the SQL code associated with a selected nested query. In one or more embodiments, the SQL generator 143 generates the SQL code associated with a selected query without generating the SQL code for a parent query and/or a child query of the selected query. The JSON data format is agnostic to the particular SQL database format for any particular SQL database system. Accordingly, a set of nested queries visualized by the graphical user interface engine 110 may be converted from a JSON data format into multiple different SQL database formats or dialects. For example, the query SQL generator 142 may convert the same set of JSON data associated with a particular nested query into the Microsoft SQL Server dialect, the Oracle SQL dialect, the MySQL dialect, the PostgreSQL dialect, or any other SQL dialect associated with a particular database system.

A query execution engine 144 executes the nested queries by executing the SQL code to return records from one or more databases. In one or more embodiments, the graphical user interface engine 110 includes a button 116 to execute the SQL code associated with a selected nested query without executing the SQL code associated with a parent query. Upon receiving an input to generate the query for a selected sub-query, the query execution engine 144 generates query results 138 for the selected sub-query. In one or more embodiments, responsive to receiving an input based on the "Get Count" button 117, the query execution engine 144 generates a result count 137 and stores the result count in the data repository 130. The results count 137 includes a number representing the query data returned by the selected sub-query. The results count does not include the records that would be returned by the query. For example, if a query, upon execution, would return 10,000 records as results of the query, the results count 137 includes the number 10,000, but not the records.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 8, titled "Computer Networks and Cloud Networks."

In one or more embodiments, the graphical user interface engine 110 refers to hardware and/or software configured to perform operations described herein for displaying query metadata, displaying a set of nested queries, and displaying a query detail region for a selected query among the set of nested queries. Examples of operations for displaying and modifying a set of nested queries are described below with reference to the figures that follow.

In an embodiment, the graphical user interface engine 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Operations for Sub-Sets of Queries in Set of Nested Queries

Figure 2A:
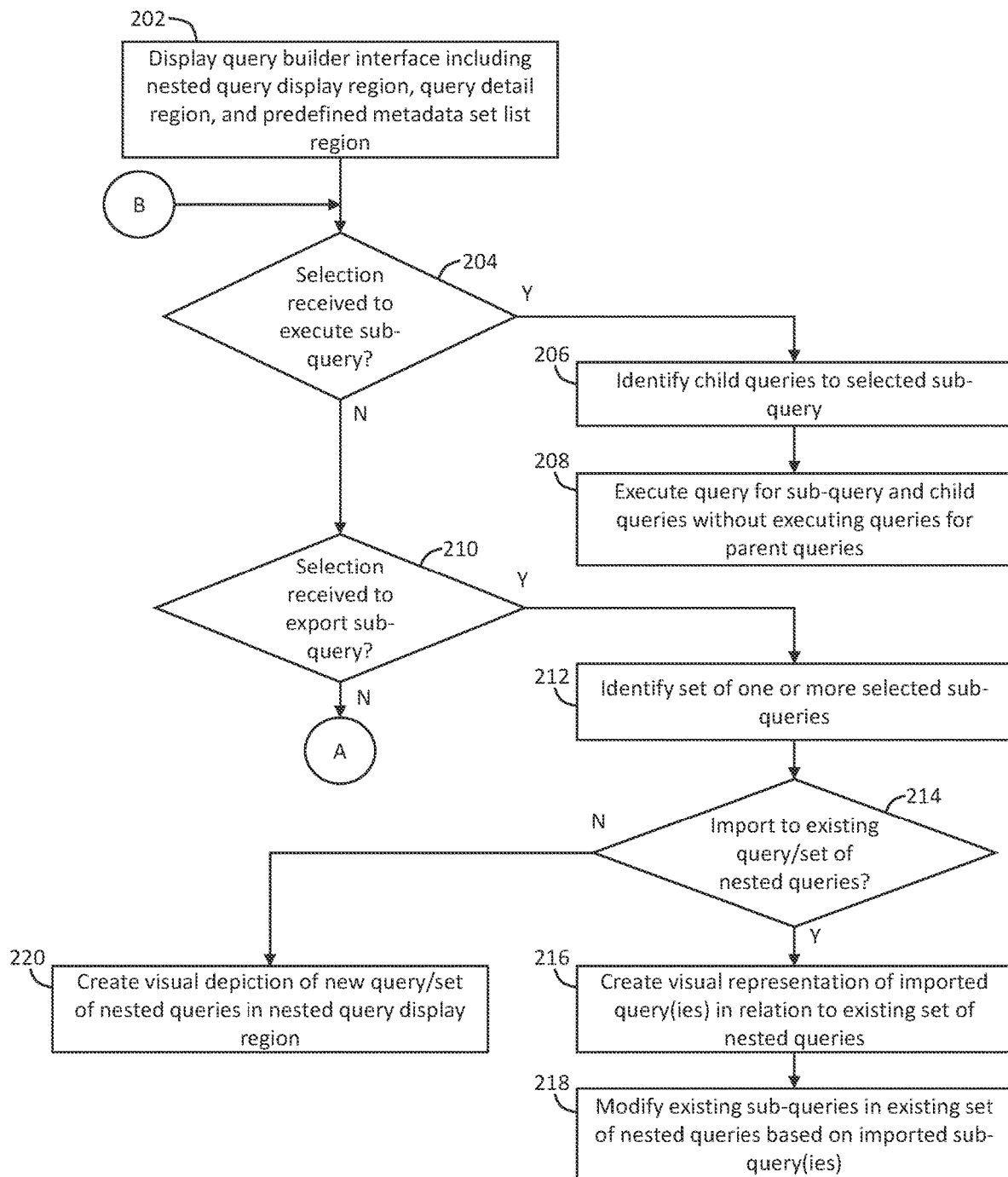
FIGS. 2A and 2B illustrate an example set of operations for executing functions with sub-sets of queries in a set of nested queries in accordance with one or more embodiments.
Figure 2B:
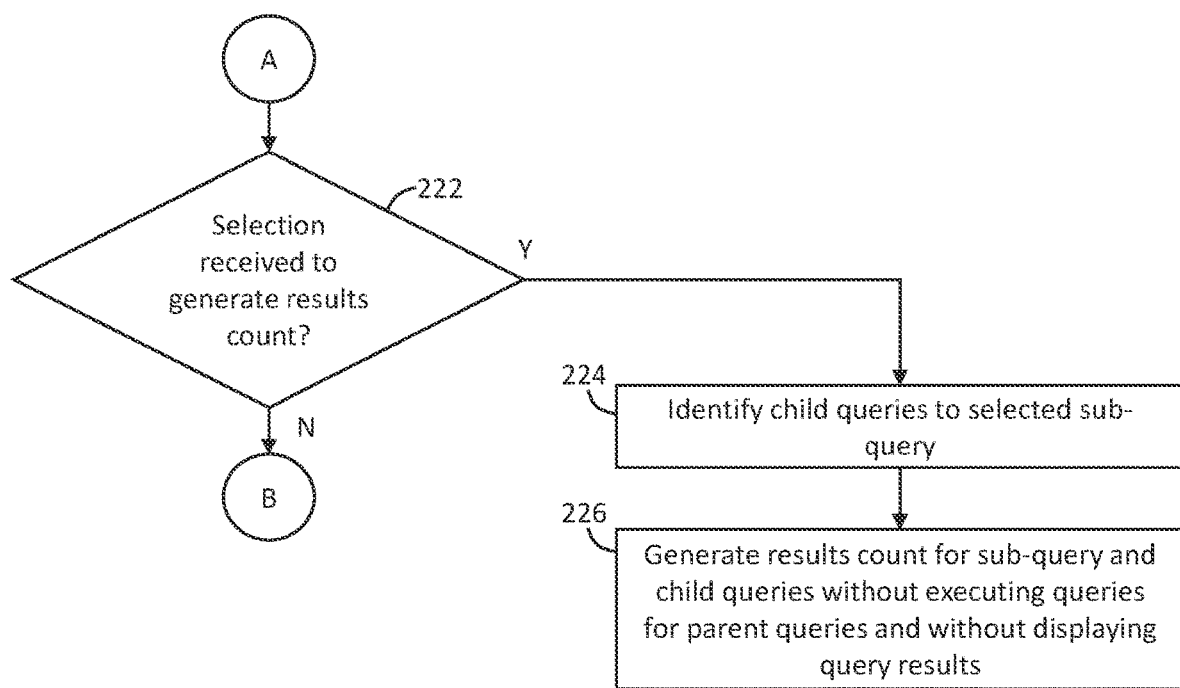

FIGS. 2A and 2B illustrate an example set of operations for executing functions of one or more sub-queries in a set of nested queries in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

In one or more embodiments, a system displays a query builder user interface (Operation 202). The user interface includes a nested query display region and a query detail region. The nested query display region may be adjacent to, and non-overlapping with, the query detail region. The nested query display region may display a set of nested queries. The set of nested queries may be displayed as a set of distinct visual representations arranged relative to each other to convey a parent/child relationship among the queries.

For example, in one embodiment, each query of a set of nested queries is displayed as a geometric shape on a background. Each geometric shape may be separate from each other geometric shape. The geometric shapes may be separated from each other by a contiguous region of the background, unbroken by connecting elements, such as lines. Instead, a parent/child relationship may be conveyed by the location of each geometric shape relative to each other geometric shape. For example, each child query may be represented as a geometric shape that is arranged below, and indented to the right of, a geometric shape representing its respective parent query. The geometric shape representing the child query may overlap the shape representing the parent query in the horizontal direction without overlapping the shape representing the parent query in the vertical direction. A shape representing a child query may be indented by a pre-defined distance—such as 1.27 centimeters or 0.5 inches. Alternatively, the shape representing the child query may be indented by a certain percentage of the length of the shape. For example, the shape representing the child query may overlap the shape of the parent query along 80% of the length of shape of the parent query.

The query detail region may include a set of editable fields associated with a particular query in the nested query display region. The query detail region may display a set of characteristics associated with a query. The set of characteristics may include a name of a query, a data object associated with the query, a description of the query, output attributes of the query, and criteria associated with the output attributes of the query. The visual representation of the query in the nested query display region may display a sub-set of the set of characteristics. For example, the visual representation of the query in the nested query display region may display only a name of the query. In addition, the visual representation of the query in the nested query display region may not include an editable field.

In one or more embodiments, the query builder interface further includes a third region displaying a list of predefined sets of metadata. The predefined sets of metadata correspond to predefined modifications to existing queries, or to new queries. For example, one set of metadata may specify a data object and a data attribute pertaining to the data object. Another set of metadata may specify one or more functions to be performed by a query on a set of retrieved data.

The system determines whether a selection is received to execute a query for a child query in a set of nested queries (Operation 204). For example, in one embodiment, the nested query display region includes an interface element that, when selected, initiates executing a query for the selected child query. The interface element may be a menu icon. In addition, or in the alternative, the query detail region may include an interface element that, when selected, initiates executing the query for the selected child query.

Based on detecting the selection to execute a query, the system identifies any child queries associated with the selected query (Operation 206). If the selected query is the lowest query in a set of nested queries, the system identifies only the selected query for execution. If the selected query includes one or more child queries, the system identifies both the selected query and each child query for execution.

The system executes the selected query and any identified child queries (Operation 208). In one or more embodiments, the system generates and maintains JSON data for a composite query represented by a nested set of queries. Based on a user selection of a child query in the composite query, the system generates SQL code for a selected query and any identified child queries of the selected query. The system may display, based on a user selection to execute a query, an interface element to allow a user to select an SQL dialect. The system may generate the SQL code in the selected SQL dialect. The system executes the query by accessing one or more data objects identified in the query that are maintained in one or more databases that operate using the SQL dialect. Based on the system detecting a selection associated with a particular child query, the system does not execute a query for any parent queries to the child queries.

If the system does not detect a selection to execute a particular sub-query, the system may determine whether a selection is received to export a sub-query, from among the set of nested queries (Operation 210). For example, in one embodiment, the nested query display region includes an interface element that, when selected, initiates an operation to export the selected query. The interface element may be a menu icon. The menu icon may include a menu item labeled "export query." Selecting the menu item "export query" may cause the query builder interface to provide additional functionality to a user, including viewing and selecting: (a) one or more additional parent queries to export, together with the selected query, (c) one or more additional child queries to export, together with the selected query, and (c) one or more sets of nested queries to which the selected query may be exported. The interface builder may also provide options for a type of export, such as whether to export the selected query: (a) to join another presently-existing query, (b) to create a new query, or (c) to create a query template for use in a future query creation operation. For example, if the selected query is a child query in a set of nested queries, and if the selected query includes two additional child queries, the system may identify one or more additional sets of nested queries to which the selected query, and additional child queries, may be exported.

In addition, or in the alternative, the query detail region may include an interface element that, when selected, initiates an operation to export the selected query and any child queries of the selected query.

The system identifies the sub-queries that are to be exported (Operation 212). If a user has selected a particular sub-set, such as "only the selected query," or "the selected query and all child queries," the system identifies which sub-queries have been selected. Alternatively, the system may select a default set of sub-queries. For example, the system may automatically identify each child query associated with a selected query. In addition, the system may identify any parent queries associated with the selected query. In one or more embodiments, the system automatically excludes any parent queries from an export operation.

The system determines whether a selection is received to export the selected query and any child queries to an existing set of nested queries (Operation 214). For example, the system may detect a selection of an interface element associated with any sub-query of a set of nested queries in the nested query display region. The interface element may include a display of pre-existing candidate queries, or sets of nested queries. The pre-existing candidate queries may be previously-generated queries, query templates, or queries being currently accessed by a user in another panel of a user interface, for example. The interface element may also include a selection option to create a new query from the selected query.

If the system detects a selection to import the selected query into another presently-existing query, the system creates a visual representation of the selected query in a nested query display region of a GUI that includes the presently-existing query (Operation 216). For example, the GUI may allow a user to drag a query from one nested query display region, displaying a source set of nested queries, to another nested query display region, displaying a target set of nested queries.

The system may receive an input indicating a relationship of the selected query relative to the other queries in the already-existing set of nested queries. For example, if the already-existing set of nested queries includes one parent query and one child query, the system may detect a user selection to place the selected query between the parent query and the child query. The system modifies the visual representation of the already-existing set of nested queries to show the selected query as a child query of the already-existing parent query and as a parent query of the already-existing child query. The selection may be performed by a drag-and-drop action of a user, by a menu item selection of a drop-down menu, or by any other method.

In an example in which the selected query includes one or more child queries, the system inserts the selected query and child query(ies) into the already-existing set of nested queries as a single unit. For example, in the example in which the already-existing set of nested queries includes a parent query and a child query, the system modifies the visual representation of the already-existing set of nested queries to show the selected query as a child query of the already-existing parent query. The system modifies the visual representation of the already-existing set of nested queries to show a lowest child query, among the imported queries, as a parent query of the already-existing child query.

In one embodiment, a user may select to omit one or more child queries from an export operation. For example, a selected sub-query may include a parent query and two child queries. An interface element of a user interface may provide an option to omit one or both of the child queries from the export operation. Since a parent query necessarily receives attribute values from a child query, omitting child queries from a selected query may prevent the selected query from functioning. Accordingly, the system may generate a warning indicating that a particular child query may be required, or the selected query may need to be modified, to allow the selected query to operate.

The system modifies one or both of (a) the imported query, and (b) a query in an already-existing set of nested queries based on the importing of the selected query into the already-existing set of nested queries (Operation 218). For example, in the example in which the already-existing set of nested queries includes a parent query and a child query, the system modifies the parent query to receive an input attribute from the selected query. The system further modifies the selected query to receive an input attribute from the child query. The system may further modify the functionality of the user interface by displaying in a query detail region query characteristics for the selected query, together with the visualization of the set of nested queries.

If the system detects a selection to create a new query with an exported query (Operation 214), the system creates a visual representation of the selected query in a nested query display region of a GUI (Operation 220). The nested query display region is empty of any other queries than the selected query. The system may further display characteristics of the selected query in a query detail region. The query detail region includes editable fields to modify characteristics of the selected query.

If the system does not detect a selection to export a query, the system may determine whether a selection is received to generate a results count (Operation 222). For example, the nested query display region may include interface elements associated with each sub-query in a nested query. The interface elements may be selected by a user to initiate a results count operation for the selected sub-query and any child queries. The results count may generate a display of a number of results for a particular query without displaying the actual records and data returned by the query.

Based on detecting the selection to initiate a "results count" operation, the system identifies any child queries associated with the selected query (Operation 224). Since any selected query necessarily uses results from any downstream child queries, the system joins to a selected query any child query of the selected query to perform a results count operation.

The system generates a results count for a selected sub-query (Operation 226). Generating the results count may include: (a) converting JSON data associated with the selected query and child query/queries into SQL code for a particular database, (b) running database queries for the selected query and child query/queries, and (c) displaying a value representing a number of records returned by the query, without displaying the records returned by the query.

In one embodiment, the system displays the results count in the nested query display region of the query builder interface. Alternatively, or in addition, the system may display the results count adjacent to a selected query. The results count may be displayed in a window that is either partially or entirely in the nested query display region. Alternatively, the window may be partially or entirely in the query detail region or selectable metadata region.

In one embodiment, the system displays a respective results count adjacent to each of the selected query and each respective child query. For example, a results count for a child query may be 10,000, and a results count for the selected query, if it is the parent query to the child query, may be 5,000.

In one embodiment, the system may modify the functionality of the user interface by continuously displaying results counts for one or more queries in a set of nested queries. For example, the system may detect a selection to generate a results count for a selected query and two child queries. The system may generate an initial results count by displaying three values arranged alongside the three queries. The system may continue to display the results counts and automatically update the three values based on user input modifying the queries. For example, if a user modifies conditions of one of the queries to limit the results obtained by the query, the system may automatically update the results count associated with the modified query, and the results counts associated with any other queries that obtain results from the modified query. The system may refrain from executing the query if the modifications to the queries only relate to previously-accessed results. For example, if an initial results count value is one thousand when a query condition includes a criterion "less than or equal to," and if the system detects a modification of the criterion to "equal to," the system may access the previously-returned data results to reduce the results counts. The system may not need to access the underlying databases storing data objects that are accessed by the queries. Accordingly, the system may allow a user to define queries that meet pre-defined limits for resources used or results returned, without the need to repeatedly initiate queries to a database, and without the need for a user to view the sets of records returned by the queries.

In one embodiment, the nested queries in the nested query display region define a composite query. As the system updates the queries based on imported/exported queries or modifications to the query characteristics, the system generates JSON data describing the composite query. The JSON data may be SQL-database-agnostic. The system may use the same JSON data to generate SQL-database code for multiple different SQL databases having different SQL dialects.

4. Independent Execution of Isolated Sub-Query in Query Set

Figure 3:
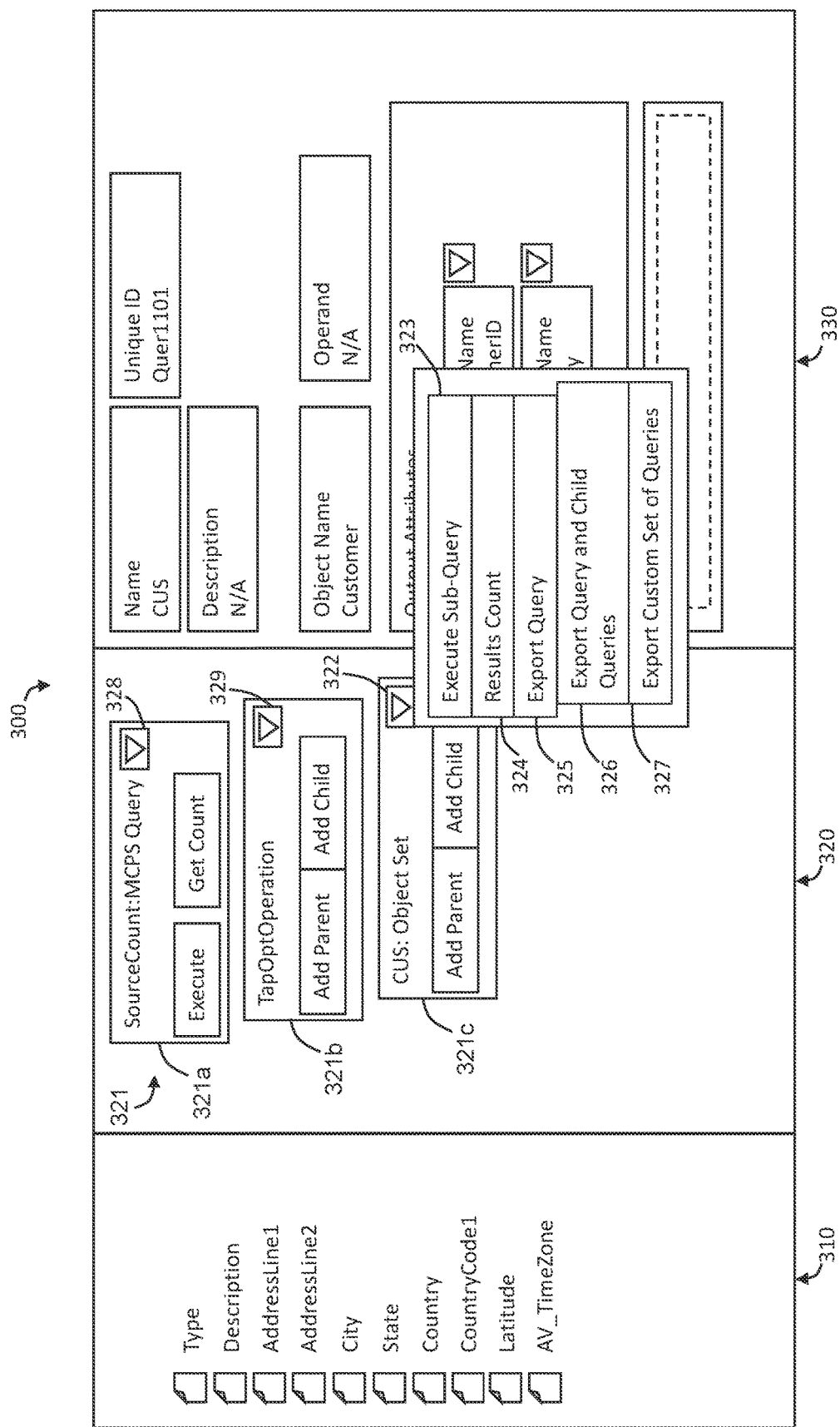
FIG. 3 illustrates an example embodiment of a user interface for performing operations with a sub-set of queries in a set of nested queries.

FIG. 3 illustrates an example embodiment of a graphical user interface (GUI) for executing a sub-query among a set of nested queries. In one or more embodiments, an interactive graphical user interface (GUI) 300 includes a selectable metadata region 310, a nested query display region 320, and a query detail region 330. In one or more embodiments, a system displays one or both of the selectable metadata region 310 and the query detail region 330 simultaneously with the nested query display region 320.

The nested query display region 320 displays visual representation of a composite query 321 comprising a set of nested queries. In the example illustrated in FIG. 3, the visual representation 321a represents a parent query. Visual representation 321b represents a child query of the query represented by the visual representation 321a. Visual representation 321b is also a parent query of a child query represented by the visual representation 321c. A child query may be referred to as a nested query. Each of the queries 321a-321c that make up the set of nested queries 321 is a sub-query. The sub-queries 321a-321c are configured to execute sequentially. The combined sub-queries 321a-321c that are configured to execute sequentially comprise a composite query. Based on receiving a selection to execute the top-most level parent query in the composite query, the system executes the child queries and then executes the top-most level parent query.

In the description that follows, visual representations 321a-321c may be referred to as "queries" for ease of description, even though the visual representations 321a-321c only visually represent queries. The queries 321a-321c are arranged relative to each other in the nested query display region 320 to display a visual indicator of their nested relationships relative to each other. Query 321b is arranged below, and indented to the right, relative to query 321a to indicate query 321b is a child query of the query 321a. Similarly, query 321c is arranged below, and indented to the right, relative to query 321b to indicate query 321c is a child query of query 321b. In the present specification and claims, a child query is a query that is configured to begin execution following a start of execution of a parent query. The child query may return one or more results to the parent query. In one or more embodiments, the parent query performs one or more operations on results obtained from one or more child queries and outputs a result. Operations may include logical operations to filter returned results (such as "only return results containing value "1" for Attribute 1, and value "2" for Attribute 2). Operations may further include passing a set of results through a query to a parent query without performing a logical operation on the results to filter the results.

As illustrated in FIG. 3, the query 321c may include a menu button 332. Selection of the menu button 332 may result in the system displaying selectable menu items, including an "Execute Sub-Query" button 323 to execute a selected sub-query without executing a parent query. In one or more embodiments, upon detecting a selection of the "Execute Sub-Query" button 323, the system executes only the sub-query 321c among the set of nested queries 321. Executing the query includes converting JSON data into an SQL code associated with a particular database and querying the database to obtain specified records from the database.

Executing the query includes obtaining query results from one or more data sources. Examples of data sources include data objects and data tables stored in a database, or output by one or more child sub-queries. Examples of results include records of a data object or table, attributes, attribute values.

In an embodiment in which the system detects an "Execute" selection associated with the query 321b, the system may execute both the sub-query 321b and the sub-query 321c. In other words, the system may execute both a parent query and any child queries of the parent query upon receiving an input to execute the parent query. The system may refrain from executing any parent queries of the selected parent query.

5. Exporting a Sub-Query in a Set of Nested Queries as a Stand-Alone Query

As illustrated in FIG. 3, the menu button 332 may include buttons for exporting one or more sub-queries to another set of nested queries. "Export query" 325 may export only the selected sub-query. "Export query and child queries" 326 may export both the selected query and each of its child queries. "Export custom set of queries" 327 may allow a user to select which sub-queries, among the set of nested sub-queries 321 to export. Initiating the operation to export the query 321c results in copying the query metadata associated with the query 321c.

In one or more embodiments, the system allows a user to select a destination for an export operation. For example, the system may allow a user to select from a list of existing sets of nested queries. Alternatively, or in addition, the system may allow the user to select "create new query" to create a new query from the exported query. According to another example, the system may allow the user to save the exported query. The saved query may be selected at a future time to add to an existing set of nested queries or to create a new set of nested queries. According to yet another example, a user may drag-and-drop a set of selected sub-queries into another nested query display region 320 which may be open in another GUI panel. For example, a user may have two nested query display regions 320 open simultaneously. One may display a source set of nested queries, from which a selected query is exported. The other may display a target set of nested queries, to which the selected query is to be exported. A user may drag-and-drop the selected query from the source nested query display region to the destination nested query display region.

Query 321b is a parent query of query 321c. In one or more embodiments, selection of the "Export query" button 325 associated with query 321b results in copying the metadata associated with only the query 321b. Selecting the "Export query and child queries" button 326 associated with the query 321b copies the metadata associated with the query 321b and the metadata associated with the query 321c, as well as metadata specifying the parent/child relationship between the queries 321b and 321c.

Figure 4:
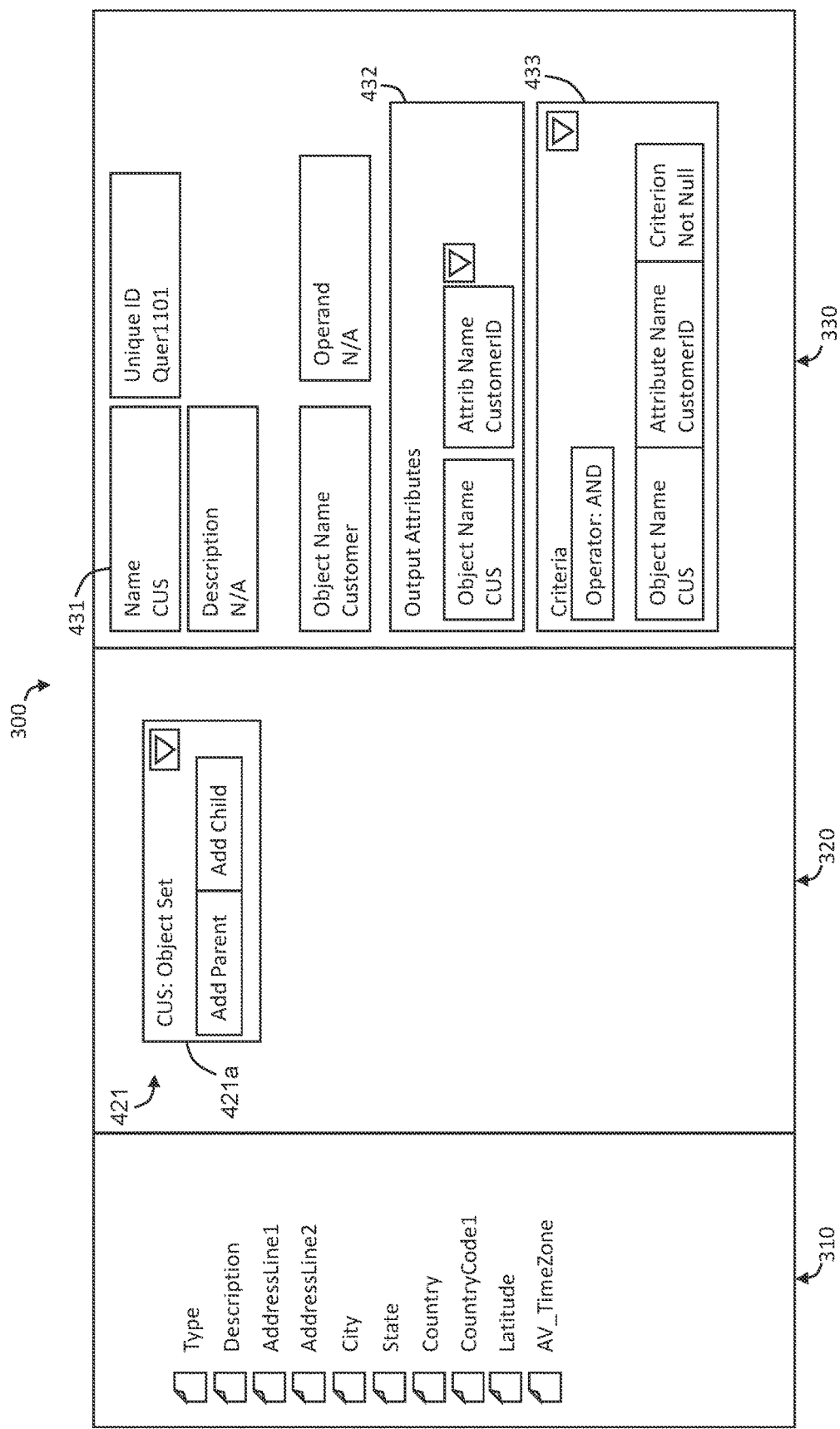
FIG. 4 illustrates an example embodiment of a user interface for exporting a sub-query as a stand-alone query.
Figure 5:
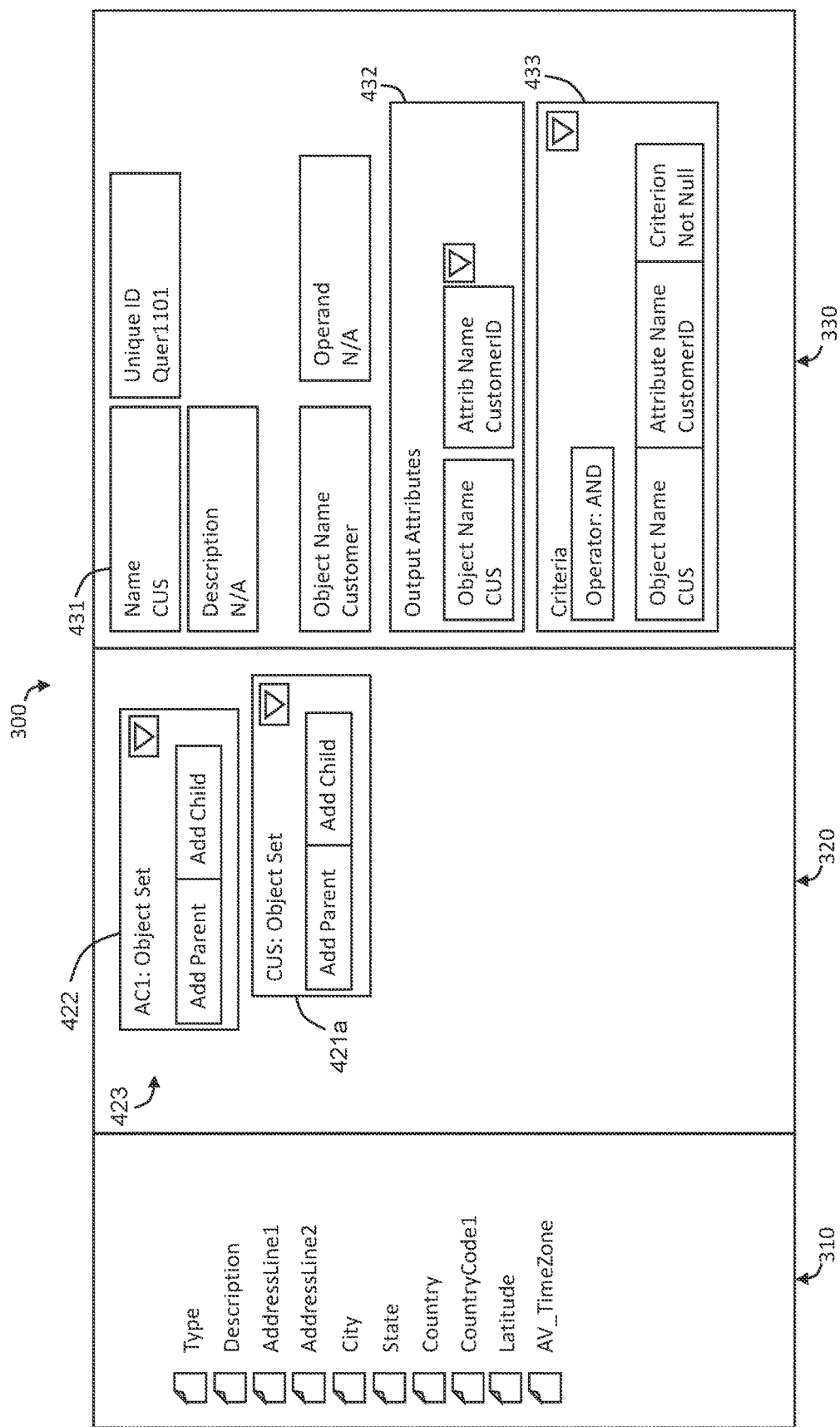
FIG. 5 illustrates an example embodiment of a user interface for creating a child query in an existing set of nested queries from a sub-set of queries from another set of nested queries.

In one or more embodiments, the saved query metadata is exported to another set of nested queries to create a new query represented by a new visual representation of the query. As illustrated in FIG. 4, selection of the "Export query" button 325 of the query 321c results in the system generating a copy 421a of the query 321c. The copy 421a of the query 321c may be added to another set of nested queries 421 different from the set of nested queries 321. For example, the copy 421a of the query 321c may be displayed as a stand-alone query. In addition, or in the alternative, as illustrated in FIG. 5, the copy 421a of the query 321c may be added as a sub-query to an existing set of nested sub-queries 423. For example, the copy 421a of the sub-query 321c may be added as a child query to the sub-query 422. The combination of the queries 422 and 421a may comprise a composite query different from the composite query comprised by the set of nested queries 321. In addition, or in the alternative, the copy 421a of the sub-query 321c may be added as a parent query to one or more child queries in a set of nested queries different from the set of nested queries 321. When the copy 421a is displayed in the nested query display region 320, details of the copy 421a are displayed in the query detail region 330. In FIG. 5, the query details include a query name 431, output attributes 432, and query criteria 433.

In one or more embodiments, when the system saves query metadata to export the query 321c, the system does not remove the query 321c from the set of nested queries 321. In an alternative embodiment, when the system saves the query metadata to export the query 321c, the system modifies the user interface and the underlying composite query by removing the query 321c from the set of nested queries 321. When the system removes the query 321c from the set of nested queries 321, the system updates the JSON data describing the set of nested queries 321. Upon execution, the system queries a database without initiating the query 321c.

In one or more embodiments, when the system receives a selection to export a query from a nested query display region, the system automatically, without user input, creates a query template using the metadata associated with the selected query. The system modifies the GUI by displaying a name associated with the newly-created query template in the selectable metadata region 310. In addition, or in the alternative, when the query being exported includes a parent query and one or more child queries, the system generates the query template using the metadata describing the set of nested queries being exported. The system updates the functionality of the user interface by allowing a user to drag and drop the new query template into the nested query display region 320 to create a new set of nested queries or to modify an existing set of nested queries. For example, adding the new query template into a nested query display region 230 results in the system generating JSON data which, upon execution, incorporates the sub-queries of the new query template into SQL code to implement a database query. In an embodiment in which the saved query includes at least one parent sub-query and at least one child sub-query, dragging and dropping the representation of the query template into the query visualization region 320 results in the GUI 300 displaying separate representations for the sub-queries corresponding to the parent query/queries and child query/queries.

6. Generation of Results Count for Sub-Query in Query Set

As illustrated in FIG. 3, the menu button 332 may include a button for obtaining a count of a number of results returned by a selected sub-query.

In one or more embodiments, the sub-query 321a includes a menu button 328, the sub-query 321b includes a menu button 329, and the sub-query 321c includes a menu button 322. Selection of any one of the menu buttons the sub-queries 321a, 321b, and 321c causes the system to generate in the GUI a menu for the respective sub-query 321a, 321b, or 321c. The menu includes a "Results Count" button 324 to generate a results count for the selected sub-query. For example, receiving an input from the "Results Count" button 324 of the sub-query 321c returns a count of a number of results that would be returned by execution of the query 321c, and not the query 321b or the query 321a. Receiving an input from a "Get Count" button of the sub-query 321b would return a count of a number of results that would be returned by execution of the query 321b and its child query 321c, and not the query 321a. Receiving an input from a "Get Count" button of the sub-query 321a would return a count of a number of results that would be returned by execution of the query 321a, its child query 321b, and the additional child query 321c.

Figure 6:
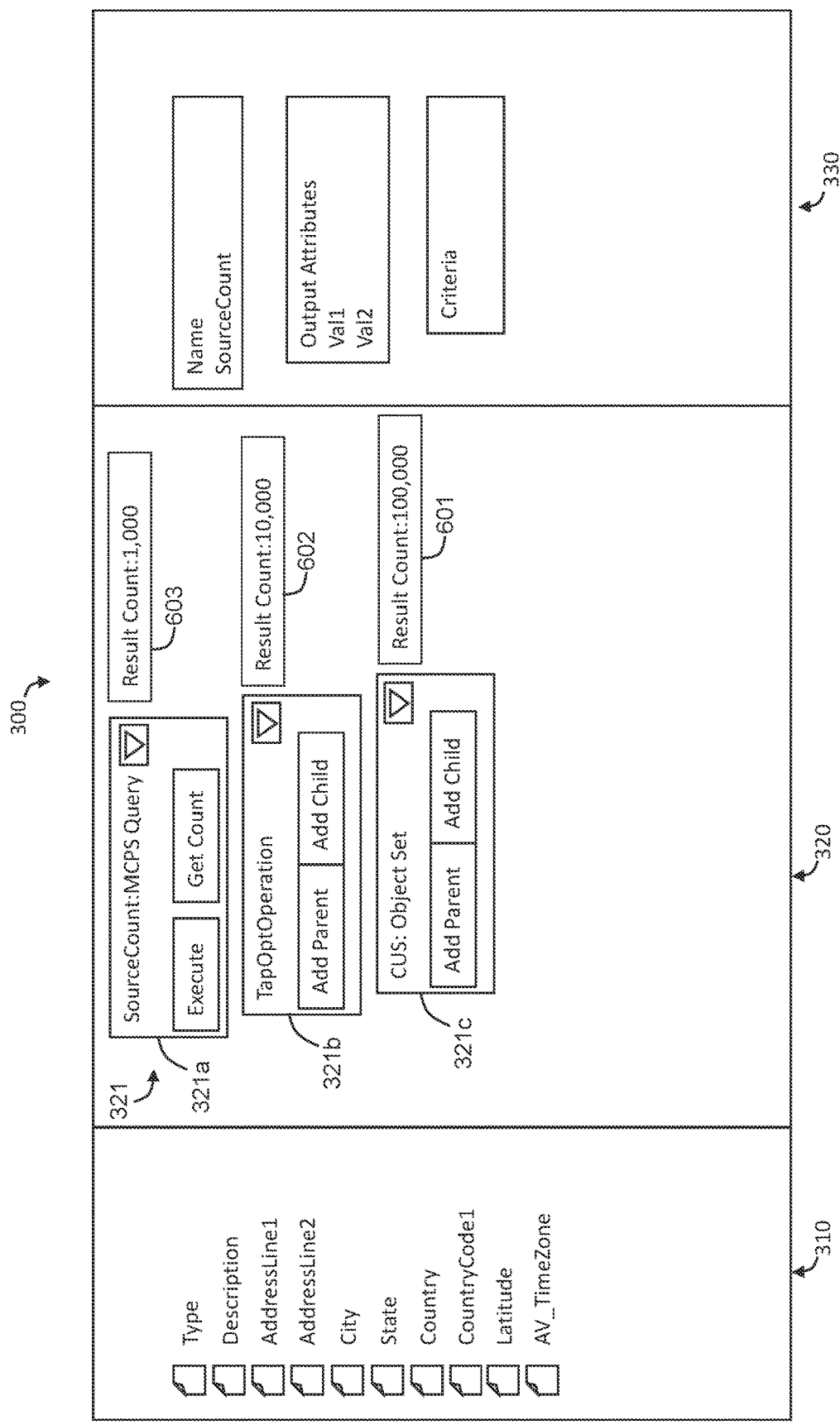
FIG. 6 illustrates an example embodiment of a user interface for generating a results count for sub-queries in a set of nested queries.

As illustrated in FIG. 6, the system calculates and displays a result count 601 associated with the query 321c responsive to receiving an input from a "Get Count" button associated with the query 321c. The system calculates and displays a result count 602 associated with the query 321b responsive to receiving an input from a "Get Count" button associated with the query 321b. The system calculates and displays a result count 603 associated with the query 321a responsive to receiving an input from a "Get Count" button associated with the query 321a.

In one or more embodiments, the system calculates the result count for a selected sub-query without calculating the result count for any parent queries of the selected sub-query in the set of nested queries 321. In one or more embodiments, when the selected sub-query is a parent query, the system calculates the result count for the selected sub-query and any child queries without calculating the result count for any additional parent queries of the selected sub-query.

In one or more embodiments, the count includes: a number of records that would be returned by the query upon execution of the query, a number of attribute values that would be returned by the query, and a number of objects from which records, attributes, or attribute values would be returned upon execution of the query. In one or more embodiments, the count can be calculated without displaying query results. In other words, if a particular query would return 100,000 records from one or more data objects as an output, the system may output the value "100,000" without storing or outputting the attribute names or attribute values of the records. In one or more embodiments, a user or operator may provide the input to get the count for the query prior to executing the query. The user or operator may modify the query based on the count.

In one embodiment, the system may modify the functionality of the user interface 300 by continuously displaying the results counts 601, 602, and 603 for one or more queries in the set of nested queries 321. For example, the system may detect a selection to generate a results count for the sub-query 321a. The system may generate an initial results count by displaying the three results counts 601, 602, and 603. The system may continue to display the results counts and automatically update the three values based on user input modifying the queries. For example, if a user modifies conditions of the query 321c in the query details region 330 to limit the results obtained by the query 321c, the system may automatically update the results count 601 associated with the modified query to "80,000," and the results counts 602 and 603 associated with the other queries 321b and 321a that obtain results from the modified query 321c. Accordingly, the system may allow a user to adjust queries 321a-321c to meet pre-defined limits for resources used or results returned, without the need to analyze query results including data object information, including attribute names and attribute values.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
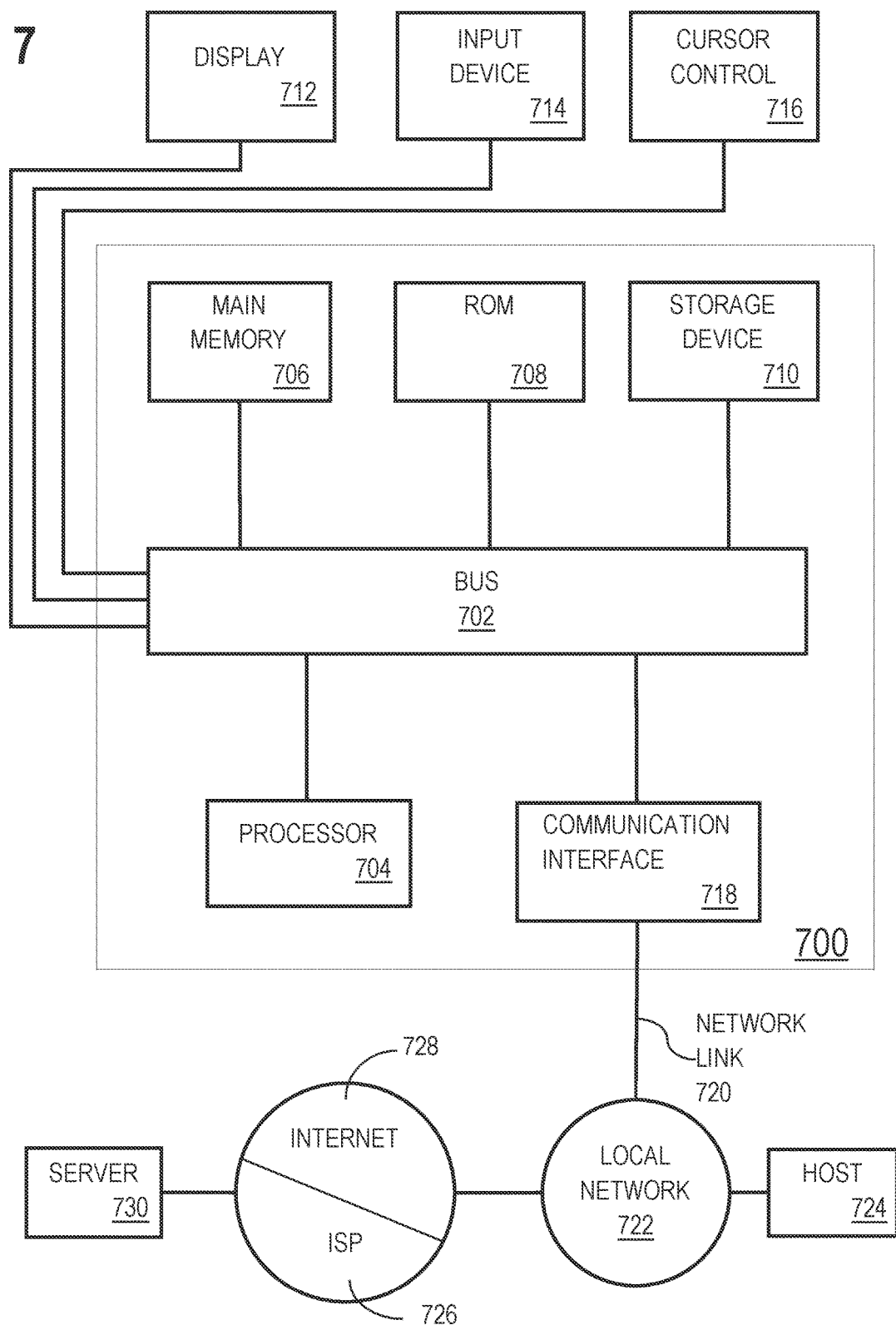
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a first composite query comprising a first plurality of nested queries;
   displaying, in a first region of a graphical user interface (GUI), a plurality of visual representations corresponding respectively to the first plurality of nested queries, the plurality of visual representations comprising:
      a first visual representation representing a first query of the first plurality of nested queries, wherein the first query is associated with first query information including a first data object from which the first query is configured to retrieve a first set of one or more records based on a first set of one or more attribute values; and
      a second visual representation representing a second query of the first plurality of nested queries, wherein the second query is a child query of the first query, wherein the first query is executed based on results from the second query, wherein the second query is associated with second query information including a second data object from which the second query is configured to retrieve a second set of one or more records based on a second set of one or more attribute values;
   wherein the second visual representation is displayed relative to the first visual representation to depict the second query being the child query of the first query;
   wherein the first query is configured to use a result from an execution of the second query based on the second query being the child query of the first query,
   receiving a first input associated with the second visual representation to export the second query;
   responsive to receiving the first input:
      generating, by copying metadata associated with the second query, a third query that is external to, and independent of, the first composite query, wherein the first composite query is not configured to use results of the third query based on the third query being independent of the first composite query, wherein the metadata includes the second query information.

2. The non-transitory computer readable medium of claim 1, wherein the third query is generated without copying metadata associated with the first query.

3. The non-transitory computer readable medium of claim 1, wherein the third query is a nested query in a second plurality of nested queries corresponding to a second composite query.

4. The non-transitory computer readable medium of claim 1, wherein generating the third query comprises:
   modifying a display of the first region of the GUI to stop displaying the first composite query and to initiate display of the third query.

5. The non-transitory computer readable medium of claim 1, wherein operations further comprise:
   determining that a fourth query is a child query of the second query;
   receiving a second input to export the second query and one or more child queries of the second query;
   responsive to receiving the second input, generating a second composite query at least by:
      generating, by copying metadata associated with the second query, the third query that is external to, and independent of, the first composite query;
      generating, by copying metadata associated with the fourth query, a fifth query that is external to, and independent of, the first composite query; and
      generating metadata to specify the fifth query as a child query of the third query;
   wherein the first composite query is configured to not use results of the third query or the fifth query.

6. The non-transitory computer readable medium of claim 5, wherein receiving the second input comprises:
   detecting a first selection of a first user interface element displayed on the GUI in association with the second visual representation;
   responsive to the first selection, displaying a third user interface element on the GUI in association with the second visual representation and a fourth user interface element on the GUI in association with the second visual representation;
   wherein receiving the first input comprises detecting a selection of the third user interface element, and
   wherein receiving the second input comprises detecting a selection of the fourth user interface element.

7. The non-transitory computer readable medium of claim 6, wherein the operations further comprise:
   displaying, concurrently with the first region, a second region of the GUI comprising a plurality of editable fields specifying characteristics of at least one of the first query and the second query;

responsive to the first selection, displaying a graphical window element covering at least a portion of the first region and at least a portion of the second region; and displaying the third user interface element and the fourth user interface element within the graphical window element.

8. The non-transitory computer readable medium of claim 1, wherein the operations further comprise:

displaying a second composite query comprising a second plurality of nested queries, wherein generating the third query comprises:

modifying the second composite query by adding the third query to the second composite query as a new nested query to generate a third composite query.

9. The non-transitory computer readable medium of claim 1, wherein the operations further comprise:

displaying in the GUI, and concurrently with a third visual representation representing the third query, the second query information including the second data object from which the third query is configured to retrieve the second set of one or more records.

10. A method comprising:

identifying a first composite query comprising a first plurality of nested queries;

displaying, in a first region of a graphical user interface (GUI), a plurality of visual representations corresponding respectively to the first plurality of nested queries, the plurality of visual representations comprising:

a first visual representation representing a first query of the first plurality of nested queries, wherein the first query is associated with first query information including a first data object from which the first query is configured to retrieve a first set of one or more records based on a first set of one or more attribute values; and a second visual representation representing a second query of the first plurality of nested queries, wherein the second query is a child query of the first query, wherein the first query is executed based on results from the second query, wherein the second query is associated with second query information including a second data object from which the second query is configured to retrieve a second set of one or more records based on a second set of one or more attribute values;

wherein the second visual representation is displayed relative to the first visual representation to depict the second query being the child query of the first query;

wherein the first query is configured to use a result from an execution of the second query based on the second query being the child query of the first query, receiving a first input associated with the second visual representation to export the second query;

responsive to receiving the first input:

generating, by copying metadata associated with the second query, a third query that is external to, and independent of, the first composite query, wherein the first composite query is not configured to not use results of the third query based on the third query being independent of the first composite query, wherein the metadata includes the second query information.

11. The method of claim 10, wherein the third query is generated without copying metadata associated with the first query.

12. The method of claim 10, wherein the third query is a nested query in a second plurality of queries corresponding to a second composite query.

13. The method of claim 10, wherein generating the third query comprises:

modifying a display of the first region of the GUI to stop displaying the first composite query and to initiate display of the third query.

14. The method of claim 10, further comprising:

determining that a fourth query is a child query of the second query;

receiving a second input to export the second query and one or more child queries of the second query;

responsive to receiving the second input, generating a second composite query at least by:

generating, by copying metadata associated with the second query, the third query that is external to, and independent of, the first composite query;

generating, by copying metadata associated with the fourth query, a fifth query that is external to, and independent of, the first composite query; and generating metadata to specify the fifth query as a child query of the third query;

wherein the first composite query is configured to not use results of the third query or the fifth query.

15. The method of claim 14, wherein receiving the second input comprises:

detecting a first selection of a first user interface element displayed on the GUI in association with the second visual representation;

responsive to the first selection, displaying a third user interface element on the GUI in association with the second visual representation and a fourth user interface element on the GUI in association with the second visual representation;

wherein receiving the first input comprises detecting a selection of the third user interface element, and wherein receiving the second input comprises detecting a selection of the fourth user interface element.

16. The method of claim 15, further comprising:

displaying, concurrently with the first region, a second region of the GUI comprising a plurality of editable fields specifying characteristics of at least one of the first query and the second query;

responsive to the first selection, displaying a graphical window element covering at least a portion of the first region and at least a portion of the second region; and displaying the third user interface element and the fourth user interface element within the graphical window element.

17. A system comprising:

one or more processors; and memory storing instructions that, when executed by the one or more processors, cause the system to perform operations comprising:

identifying a first composite query comprising a first plurality of nested queries;

displaying, in a first region of a graphical user interface (GUI), a plurality of visual representations corresponding respectively to the first plurality of nested queries, the plurality of visual representations comprising:

a first visual representation representing a first query of the first plurality of nested queries, wherein the first query is associated with first query information including a first data object from which the first query is configured to retrieve a first set of one or more records based on a first set of one or more attribute values; and a second visual representation representing a second query of the first plurality of nested queries, wherein the second query is a child query of the first query, wherein the first query is executed based on results from the second query, wherein the second query is associated with second query information including a second data object from which the second query is configured to retrieve a second set of one or more records based on a second set of one or more attribute values;

wherein the second visual representation is displayed relative to the first visual representation to depict the second query being the child query of the first query;

wherein the first query is configured to use a result from an execution of the second query based on the second query being the child query of the first query, receiving a first input associated with the second visual representation to export the second query;

responsive to receiving the first input:
  generating, by copying metadata associated with the second query, a third query that is external to, and independent of, the first composite query, wherein the first composite query is not configured to not use results of the third query based on the third query being independent of the first composite query,
  wherein the metadata includes the second query information, and
  wherein the third query is configured based on the metadata associated with the second query.

18. The system of claim 17, wherein the third query is generated without copying metadata associated with the first query.

19. The system of claim 17, wherein the third query is a nested query in a second plurality of queries corresponding to a second composite query.

20. The system of claim 17, wherein generating the third query comprises:
  modifying a display of the first region of the GUI to stop displaying the first composite query and to initiate display of the third query.

21. The system of claim 17, wherein operations further comprise:
  determining that a fourth query is a child query of the second query;
  receiving a second input to export the second query and one or more child queries of the second query;
  responsive to receiving the second input, generating a second composite query at least by:
    generating, by copying metadata associated with the second query, the third query that is external to, and independent of, the first composite query;
    generating, by copying metadata associated with the fourth query, a fifth query that is external to, and independent of, the first composite query; and
    generating metadata to specify the fifth query as a child query of the third query;
  wherein the first composite query is configured to not use results of the third query or the fifth query.

22. The system of claim 21, wherein receiving the second input comprises:
  detecting a first selection of a first user interface element displayed on the GUI in association with the second visual representation;
  responsive to the first selection, displaying a third user interface element on the GUI in association with the second visual representation and a fourth user interface element on the GUI in association with the second visual representation;
  wherein receiving the first input comprises detecting a selection of the third user interface element, and
  wherein receiving the second input comprises detecting a selection of the fourth user interface element.

* * * * *

UNITED STATES PATENT AND TRADEMARK OFFICE
CERTIFICATE OF CORRECTION

PATENT NO. : 11,995,072 B2
APPLICATION NO. : 18/181468
DATED : May 28, 2024
INVENTOR(S) : Singh et al.

It is certified that error appears in the above-identified patent and that said Letters Patent is hereby corrected as shown below:

In the Claims

In Column 23, Line 60, in Claim 10, after "to" delete "not", therefor.

In Column 25, Line 26, in Claim 17, after "to" delete "not", therefor.

Signed and Sealed this
First Day of October, 2024

Katherine Kelly Vidal
*Director of the United States Patent and Trademark Office*